(12) United States Patent
Bangel et al.

(10) Patent No.: US 7,809,689 B2
(45) Date of Patent: Oct. 5, 2010

(54) SYSTEM AND METHOD FOR ON-DEMAND INTEGRATED ARCHIVE REPOSITORY

(75) Inventors: Matthew J. Bangel, Poughkeepsie, NY (US); Robert G. Madsen, Pahoa, HI (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 11/340,306

(22) Filed: Jan. 26, 2006

(65) Prior Publication Data
US 2007/0055705 A1    Mar. 8, 2007

(51) Int. Cl.
G06F 7/00 (2006.01)
G06F 17/00 (2006.01)

(52) U.S. Cl. .................. 707/667; 707/654
(58) Field of Classification Search .............. None
See application file for complete search history.

(56) References Cited

U.S. PATENT DOCUMENTS

| | | | | |
|---|---|---|---|---|
| 5,881,371 A * | 3/1999 | Reynolds | 455/83 |
| 5,893,110 A * | 4/1999 | Weber et al. | 707/104.1 |
| 5,930,791 A * | 7/1999 | Leu | 707/8 |
| 5,937,415 A * | 8/1999 | Sheffield et al. | 707/204 |
| 6,421,571 B1 * | 7/2002 | Spriggs et al. | 700/17 |
| 7,024,420 B2 * | 4/2006 | Ball et al. | 707/102 |
| 2002/0120638 A1 * | 8/2002 | Boehmke | 707/203 |
| 2002/0161784 A1 * | 10/2002 | Tarenskeen | 707/200 |
| 2003/0074378 A1 * | 4/2003 | Midgley et al. | 707/204 |
| 2004/0139128 A1 * | 7/2004 | Becker et al. | 707/204 |
| 2005/0144520 A1 * | 6/2005 | Tuma et al. | 714/15 |
| 2005/0262166 A1 * | 11/2005 | Rajeev et al. | 707/204 |
| 2006/0010154 A1 * | 1/2006 | Prahlad et al. | 707/102 |

FOREIGN PATENT DOCUMENTS

WO    WO 03/052557 A2 *   6/2003

OTHER PUBLICATIONS

*Fundamentals of Optics*, 3rd Ed., F. Jenkins et al., 1957, pp. 24-25.

* cited by examiner

*Primary Examiner*—Pierre M Vital
*Assistant Examiner*—Augustine Obisesan
(74) *Attorney, Agent, or Firm*—Schmeiser, Olsen & Watts; John R. Pivnichny

(57) ABSTRACT

System, method and computer program product for creating, managing, and accessing an information repository including a source database and an archive database. A source database and the archive database are defined to a same schema. A user terminal presents a common user interface for accessing the source database and the archive database. A timed archive agent, an end user archive agent, and a criteria based archive agent archive source data from the source database as archive data to the archive database. A criteria based restore agent and an end user restore agent are provided to restore archive data from the archive database as source data to the source database. An integrated functions agent assembles compiled data from source data and archive data and present the compiled data to the user interface.

15 Claims, 9 Drawing Sheets

SYSTEM AND METHOD FOR ON-DEMAND INTEGRATED ARCHIVE REPOSITORY

CROSS REFERENCES TO RELATED APPLICATIONS

Copending U.S. patent application Ser. No. 11/122,584, filed 5 May 2005, entitled "METHOD, SYSTEM, AND PROGRAM PRODUCT FOR USING ANALYSIS VIEWS TO IDENTIFY DATA SYNCHRONIZATION PROBLEMS BETWEEN DATABASES", and Ser. No. 10/040,844, filed 7 Jan. 2002, for a workstation management tool, are assigned to the same assignee hereof and contain subject matter related, in certain respects, to the subject matter of the present application. The above-identified patent applications are incorporated herein by reference.

BACKGROUND OF THE INVENTION

1. Technical Field of the Invention

This invention relates to computer databases. More particularly, it relates to a system and method for creating, managing, and accessing an archive database (information repository).

2. Background Art

Very often a database will grow too large or may contain sensitive information that needs to be isolated from general use. Such information is generally considered "old data", and is moved to an archive, generally for the purpose of maintaining an audit trail.

There is a need in the art, however, for not discarding or simply archiving excess information, but rather for maintaining such information out of the way of end-users and yet kept within a production setting where it can be queried in live time along with the production data.

SUMMARY OF THE INVENTION

System, method and computer program product for creating, managing, and accessing an information repository including a source database and an archive database, by defining the source database and the archive database to a same schema; providing to a user terminal a common user interface for accessing the source database and the archive database; selectively executing a timed archive agent, an end user archive agent, and a criteria based archive agent for archiving source data from the source database as archive data to the archive database; selectively executing a criteria based restore agent and an end user restore agent to restore archive data from the archive database as source data to the source database; and executing an integrated functions agent to assemble compiled data from source data and archive data and present the compiled data to the user interface.

Other features and advantages of this invention will become apparent from the following detailed description of the presently preferred embodiment of the invention, taken in conjunction with the accompanying drawings.

DETAILED DESCRIPTION OF THE BEST MODE

In accordance with a preferred embodiment of the invention, a system and method is provided for creating, maintaining, and using an integrated archive repository, or mirror database application, having a schema identical in all relevant respects to that of an original database source application, or production repository or database.

In accordance with some criteria, such as a straight scheduled archive, archive on demand, information becoming sensitive, soft document deletion, and so forth, information is moved from the source application to a mirror archive where the information is available for secure direct access by qualified personnel and also for restoration on demand to the source application and for integration with the source information to support reports, measurements, audits, and so forth.

Thus, information is not merely archived, but placed in an alternative repository where it remains integrated with the original repository, thus keeping the information in a production setting. That alternative repository is a database which sits outside of the production application and to which information is removed when no longer used by the application. This can be queried in live time along with the production data, but it is still out of the end-user's way.

Figure 1:
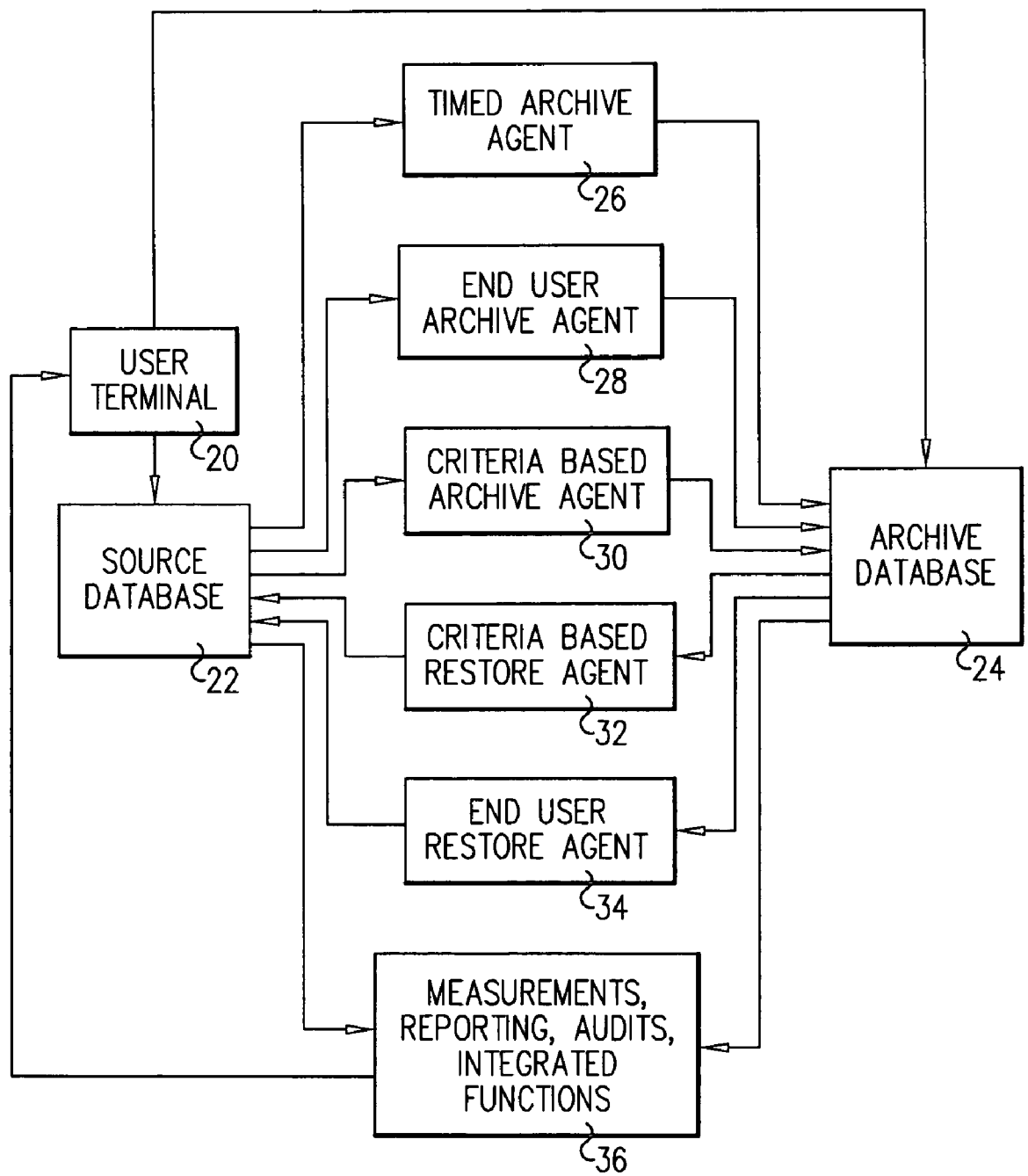
FIG. 1 is a schematic representation of the system of the invention for an on-demand integrated archive repository.

Referring to FIG. 1, source database 20 information is directed to and received from archive database 24 by way of several agents, including timed archive 26, end user archive 28, criteria based archive 30, criteria based restore 32, and end user restore 34. Measurements, reporting, audits and integrated functions 36 receives data from both archive database 24 and source database 22. End user terminal 20 accesses source database 22 and archive database 24.

Figure 2:
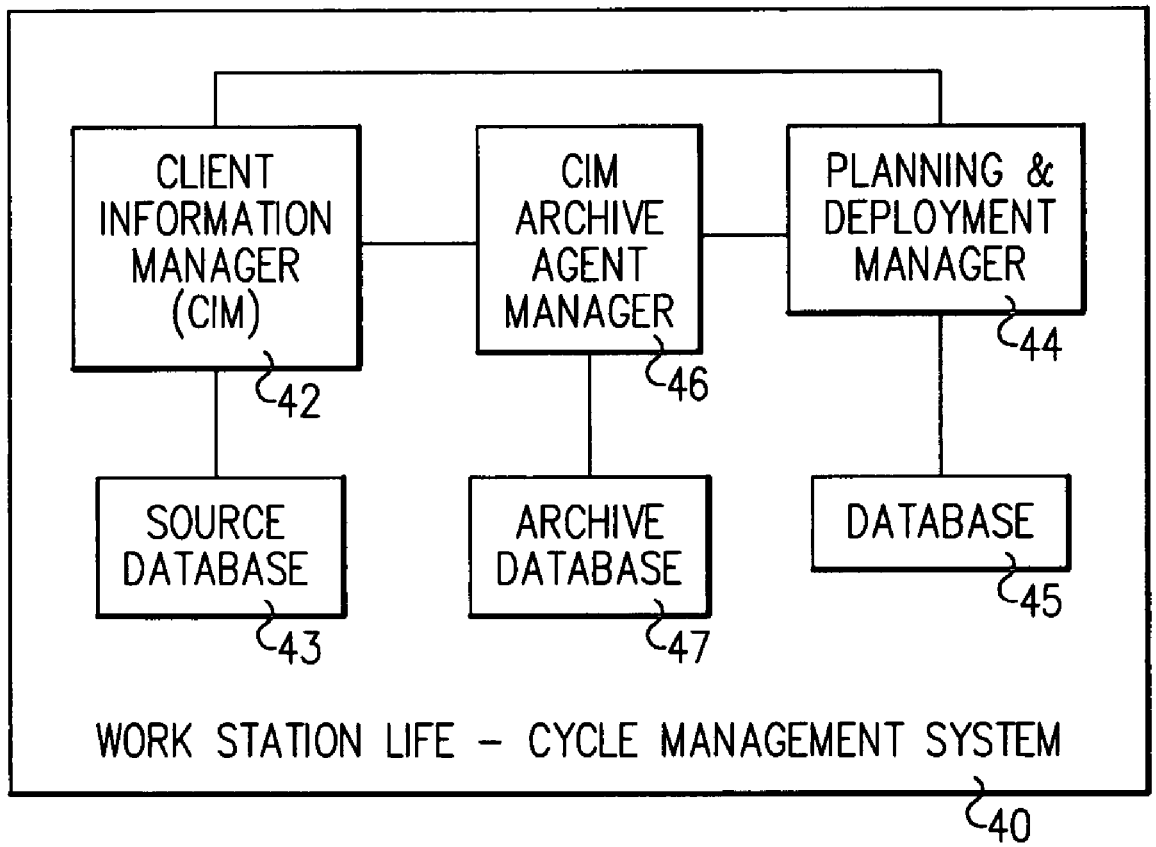
FIG. 2 is a schematic representation of an exemplary system utilizing an on-demand integrated archive repository.

Referring to FIG. 2, in accordance with an exemplary embodiment of the invention, a work station life cycle management system 40 includes a set of applications, including a client information manager 42 and database 43, a workstation planning and deployment manager 44 and database 45, and an archive client manager 46 and database 47. The client information manager (CIM), or source program for archived data, may be, for example, a database and an access program.

The client information manager (CIM) 42 includes a database 43 with information about people in an organization (such as a division of a corporation) and the type of computing equipment they have at their workstation or otherwise in their respective offices or otherwise allocated for a person's use.

The workstation planning and deployment manager 44 includes a deployment database 45 showing for each such division the personal workstation computing budget to which the division is entitled, and provides for the scheduling and deployment of equipment, and related reporting, according to that budget.

The archive client manager 46 and database 47 provides for storage of information which must be isolated for security reasons. This is a criteria based archived database of persons who had a machine deployed, including transitioned employees, and includes the same information in the same format as for the client information manager 42.

Another example of information stored to archive database 47, and of uses of such information, include new hires and transfers between divisions who need to be moved into CIM database 43 and deployed equipment upon arrival on the job.

An asset manager may enter such information to archive database 47 and move it into CIM database 43 at his discretion.

A timed archive of information from CIM database 43 to archive database 47 may be a complete or partial archive of database 43, which enables CIM database to be purged of selected records to manage the size of that database 43.

In order to provide certain reporting features, including measurements and auditing, all databases 43, 45, and 47 are connected through a refresh plan reports function, or agent, 44. For example, such reports may provide for each information technology (IT) representative for each division a report of business areas supported and the deployment of equipment against a deployment budget. Agent 44, in this example, in order to show how many individuals have received laptops will need to access both CIM database 43 and archive database 47.

A specific example of how this reporting function may work: suppose an employee, who was scheduled for a desk top in the first quarter, experiences a job change that requires that he be deployed a lap top immediately. Deployment and reporting agent 44 is operated by asset manager 40 to show from CIM database 43 allocation of the latest equipment deployed to this employee and to show from archive database 47 previous deployments to this employee during the planning period.

The design of each database 43, 45, 47 is common so that agent 44 can generate reports accessing them all. Each database is provided lookup views at a user interface (UI) which is the same. This is so that the user can get the same data from each of the databases listed and do comparisons and compilations upon the data contained in each, including the archive repository.

Referring to FIGS. 3, 4, 5, 6, 7, 8, and 9, several exemplary user interfaces (UIs) illustrate user access to databases 43, 45, and 47 for entering and extracting information and facilities for defining, maintaining and selecting execution agents 42, 44, and 46.

Figure 3:
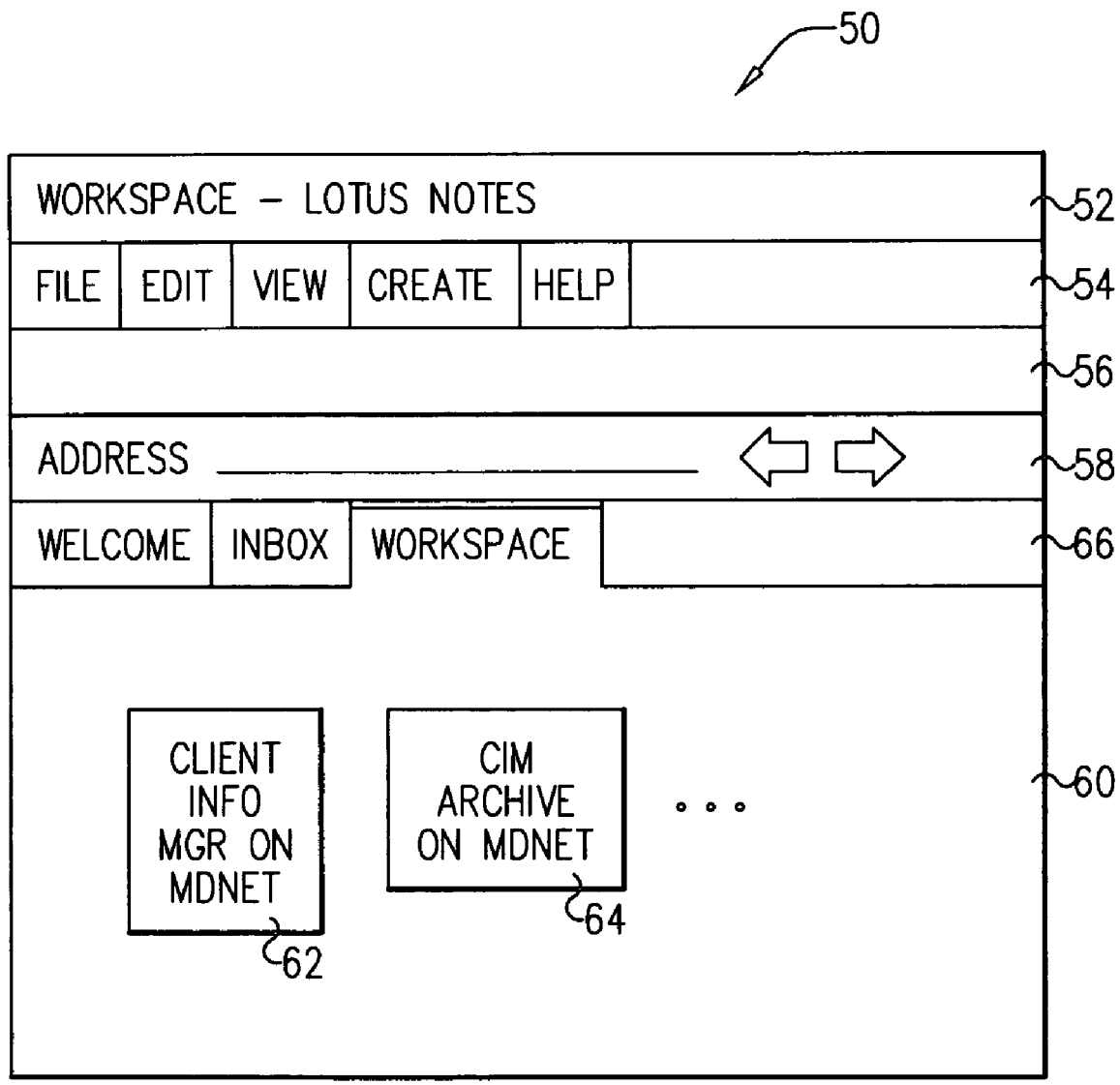
FIGS. 3, 4, 5, 6, 7, 8, and 9, are schematic representations of several exemplary user interfaces (UIs) for user access to production and integrated archive repositories, for entering and extracting information, and for defining, maintaining and selecting execution agents.

Referring to FIG. 3, a typical user interface 50 includes a title bar 52, and plurality 54 of action selection tabs, a tool bar 56, a navigation bar 58, application tabs 66, and an application window 60, in this embodiment showing tabs 62, 64 for selecting client information manager 42 and CIM archive manager 46, respectively.

Figure 4:
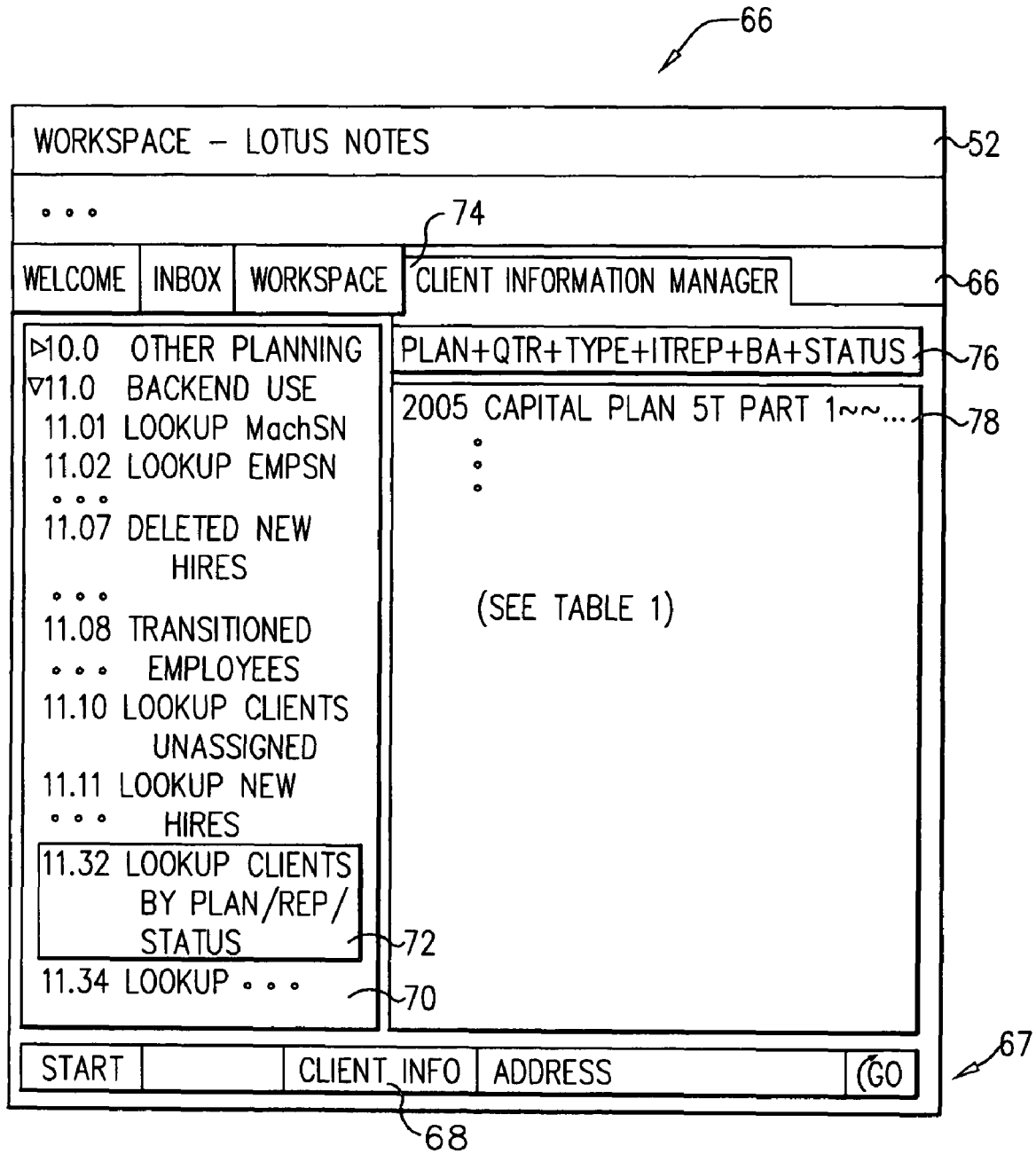

Referring to FIG. 4, illustrates a UI 66 for looking at employees, or clients. Selection of button 68 brings up a view for accessing client information manager 62 under tab 74. Selection of tab 74 displays table of contents (TOC) 70, a portion of which is shown (a scroll bar for positioning the TOC to the illustrated portion is not shown). Selection of item 72 in TOC 70 brings up in panel 78 a list of clients from CIM source database 43, with each row including fields 76 for PLAN, QUARTER, TYPE, IT REP (information technology representative), BA (business area), and STATUS. Table 1 is an example of such a listing.

TABLE 1

EXAMPLE: LIST OF CIM CLIENTS BY PLAN/REP/STATUS

2005 Capital Plan 5T Part 1~~Desktop~Gutuan~TG Ops~Deployed
2005 Capital Plan 5T Part 1~~Desktop~James~TG Ops~Deployed
2005 Capital Plan 5T Part 1~~Desktop~James~TG Ops~Deployed
2005 Capital Plan 5T Part 1~~Desktop~James~TG Ops~Deployed
2005 Capital Plan 5T Part 1~~Desktop~James~TG Ops~Deployed
2005 Capital Plan 5T Part 1~~Laptop~Gutuan~TG Ops~Deployed
2005 Capital Plan 5T Part 1~~Laptop~Gutuan~TG Ops~Deployed
2005 Capital Plan 5T Part 1~~Laptop~James~TG Ops~Deployed TABLE 1-continued

EXAMPLE: LIST OF CIM CLIENTS BY PLAN/REP/STATUS

2005 Capital Plan 5T Part 1~~Laptop~James~TG Ops~Deployed
2005 Capital Plan 5T Part 1~~Laptop~James~TG Ops~Deployed
2005 Capital Plan 5T Part 1~~Laptop~James~TG Ops~Deployed
2005 Capital Plan 5T Part 1~~Laptop~James~TG Ops~Deployed
2005 Capital Plan 5T Part 1~~Laptop~James~TG Ops~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
. . .

FIG. 4 illustrates the common nature of CIM and archive CIM, and is a look at transitioned employees and workstations deployed in CIM. The lookup view 76, 78 and 86, 88 displayed responsive to selection of item 72 from TOC 70 is a common design aspect to the two databases CIM and archive CIM, and is exactly the same in both databases 43, 47. However, the databases 43, 47 do not contain the same data. CIM archive 46 presents a list of all the old data that CIM 42 has previously worked on. This old data is called, in this example, "Transitioned Employees and Workstations that were once deployed in CIM." By taking the CIM archive data in this lookup view 88 and adding it to the CIM data in its lookup view 78 the result is a representation of all "Workstations deployed in CIM", ever.

Figure 5:
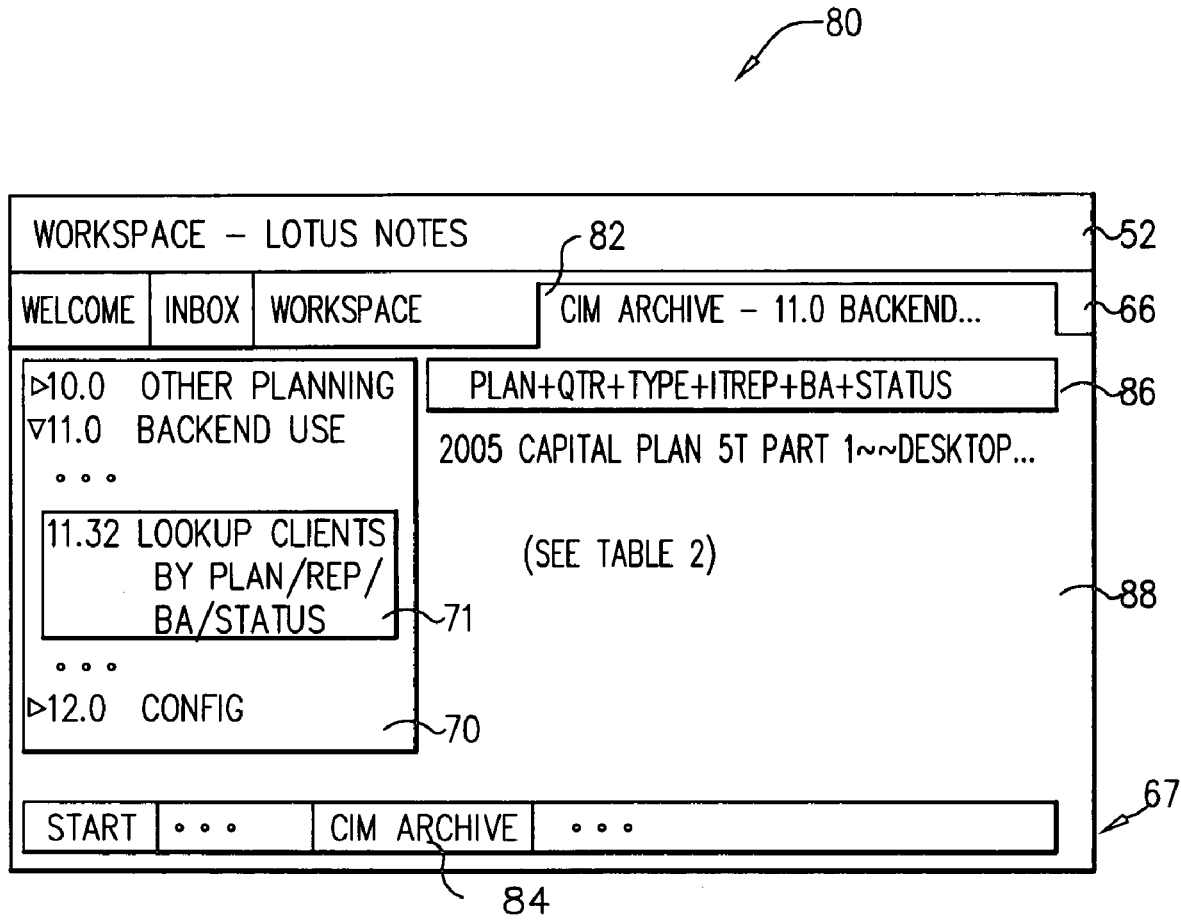

Referring to FIG. 5, an example UI 80 illustrates an example display of information selected from CIM archive database 47. Selection of CIM archive button 84 brings up a view for selecting under tab 82 a display including TOC 70. Selection of item 72 in TOC 70 brings up in panel 88 a list of clients from CIM archive database 47, with each row including fields 86 for PLAN, QUARTER, TYPE, IT REP, BA, and STATUS. Table 2 is an example of such a listing.

TABLE 2

EXAMPLE: LIST OF ARCHIVE CLIENTS BY PLAN/REP/STATUS

2005 Capital Plan 5T Part 1~~Desktop~Fred~WW Sales~Deployed
2005 Capital Plan 5T Part 1~~Desktop~Gutman~TG Ops~Deployed
2005 Capital Plan 5T Part 1~~Desktop~Gutman~TG Ops~Deployed
2005 Capital Plan 5T Part 1~~Desktop~Gutman~TG Ops~Deployed
2005 Capital Plan 5T Part 1~~Desktop~Gutman~TG Ops~Deployed
2005 Capital Plan 5T Part 1~~Laptop~James~TG Ops~Deployed
2005 Capital Plan 5T Part 1~~Laptop~Gutman~TG Ops~Deployed
2005 Capital Plan 5T Part 1~~Laptop~Gutman~TG Ops~Deployed
2005 Capital Plan 5T Part 1~~Laptop~Gutman~TG Ops~Deployed
2005 Capital Plan 5T Part 1~~Laptop~Gutman~TG Ops~Deployed
2005 Capital Plan 5T Part 1~~Laptop~James~TG Ops~Deployed
2005 Capital Plan 5T Part 1~~Laptop~James~TG Ops~Deployed
2005 Capital Plan 5T Part 1~~Laptop~James~TG Ops~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
2005 Capital Plan 5T Part 2~~Laptop~Fred~WW Sales~Deployed
. . .

FIGS. 4 and 5 illustrate that fields 76 and 86 in each of the CIM and archive databases 43, 47, respectively, are the same, which will allow for combining information from both databases into a single report and for moving information from CIM database 43 to archive database 47 without a need for reformatting.

Information added to archive database 47 may be based on criteria, and will normally not be just a snapshot of the CIM database 43. An example of such a criteria would be an employee in CIM database 43 who is no longer in the organization shown in the business area (BA) field. His record in CIM 43 may be moved to archive database 47 on a record basis either automatically or on demand.

Refresh plan reports 102 allows the user to retrieve a set of information from the three databases 43, 45, 47 previously described. It runs an agent to pull in information from all these databases and build a viewable report 108 (Table 3) that identifies problems or mishaps in the deployment process.

Archive 104 moves a document to an archived status, but does not interact with the CIM archive database.

TABLE 3

EXAMPLE REPORT
Field Definitions [Field 106 of FIG. 5]

| | | |
|---|---|---|
| A | Plan Key | |
| B | IT Rep | |
| C | Business Area (BA) | |
| D | Desk Top (DT) Allocation (W) | |
| E | DT Inventory (W) | [placed in inventory for deployment] |
| F | DT Assign (W) | [assigned to employee] |
| G | DT Consumed | |
| H | DT Assigned | |
| I | DT Requested | |
| J | DT Scheduled | |
| K | DT Deployed | [employee has received machine] |
| L | DT Assign Delta | |
| M | DT Inventory Delta | |
| N | Lap Top (LT) Allocation (W) | |
| O | LT Inventory (W) | [placed in inventory for deployment] |
| P | LT Assign (W) | [assigned to employee] |
| Q | LT Requested | |
| R | LT Scheduled | |
| S | LT Deployed | [employee has received machine] |
| T | LT Assign Delta | |
| U | LT Inventory Delta | |

| A B C | D | E | F | G | H | I | J | K | L | M | N | O | |
|---|---|---|---|---|---|---|---|---|---|---|---|---|---|
| 2005 MD Capital Plan Aaron | | | | | | | | | | | | | |
| ICP | 119 | 119 | 115 | 115 | 0 | 1 | 0 | 114 | 0 | 0 | 115 | 115 | ... |
| Interconnect Alex | 0 | 0 | 0 | 0 | 0 | 0 | 0 | 0 | 0 | 0 | 0 | 0 | ... |
| Bus Strategy | 0 | 0 | 0 | 0 | 0 | 0 | 0 | 0 | 0 | 0 | 3 | 3 | ... |
| MD Gen Mgr Jeanne | 3 | 3 | 3 | 3 | 0 | 0 | 0 | 3 | 0 | 0 | 19 | 19 | ... |
| Prod Dev Kimberly | 7 | 7 | 7 | 7 | 0 | 0 | 0 | 7 | 0 | 0 | 154 | 154 | ... |
| ASIC Products | 0 | 0 | 0 | 0 | 0 | 0 | 0 | 0 | 0 | 0 | 26 | 26 | ... |
| Std Products | 0 | 0 | 0 | 0 | 0 | 0 | 0 | 0 | 0 | 0 | 7 | 7 | ... |

Figure 6:
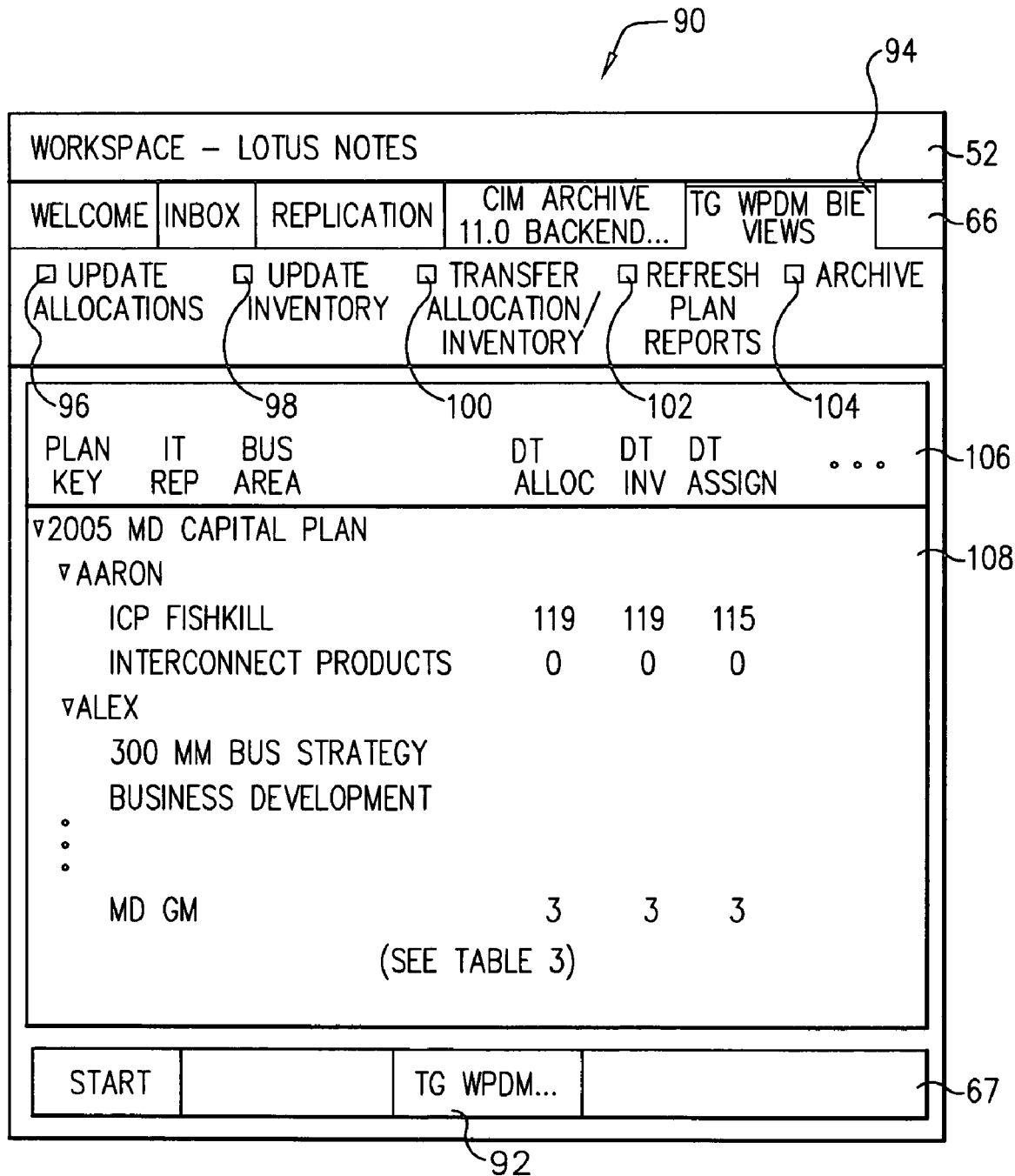

Referring to FIG. 6, a user interface 90 illustrates an exemplary report 108 generated in accordance with fields 106 responsive to selection of button 92 under technology group (TG) workplace data manager (WPDM) business information executive (BIE) tab 94 from source database 43 and archive database 47 by planning & deployment manager 44. Action tabs are provided to update allocations 96, update inventory 98, transfer allocation/inventory 100, refresh plan reports 102, and archive 104. These functions are performed with respect to a selected entry from display 108, a view in which the action "Refresh Plan Reports" 102 exists, which is the action that calls an agent to work on the selected entry. Table 3 provides an example of report 108.

Update allocations 96 and update inventory 98, neither pertinent to the present invention, update sets of numbers in the database WPDM. Transfer allocation/inventory 100, not pertinent to the present invention, moves certain numbers to and from different database documents as a method of transferring governing control over those numbers.

Figure 7:
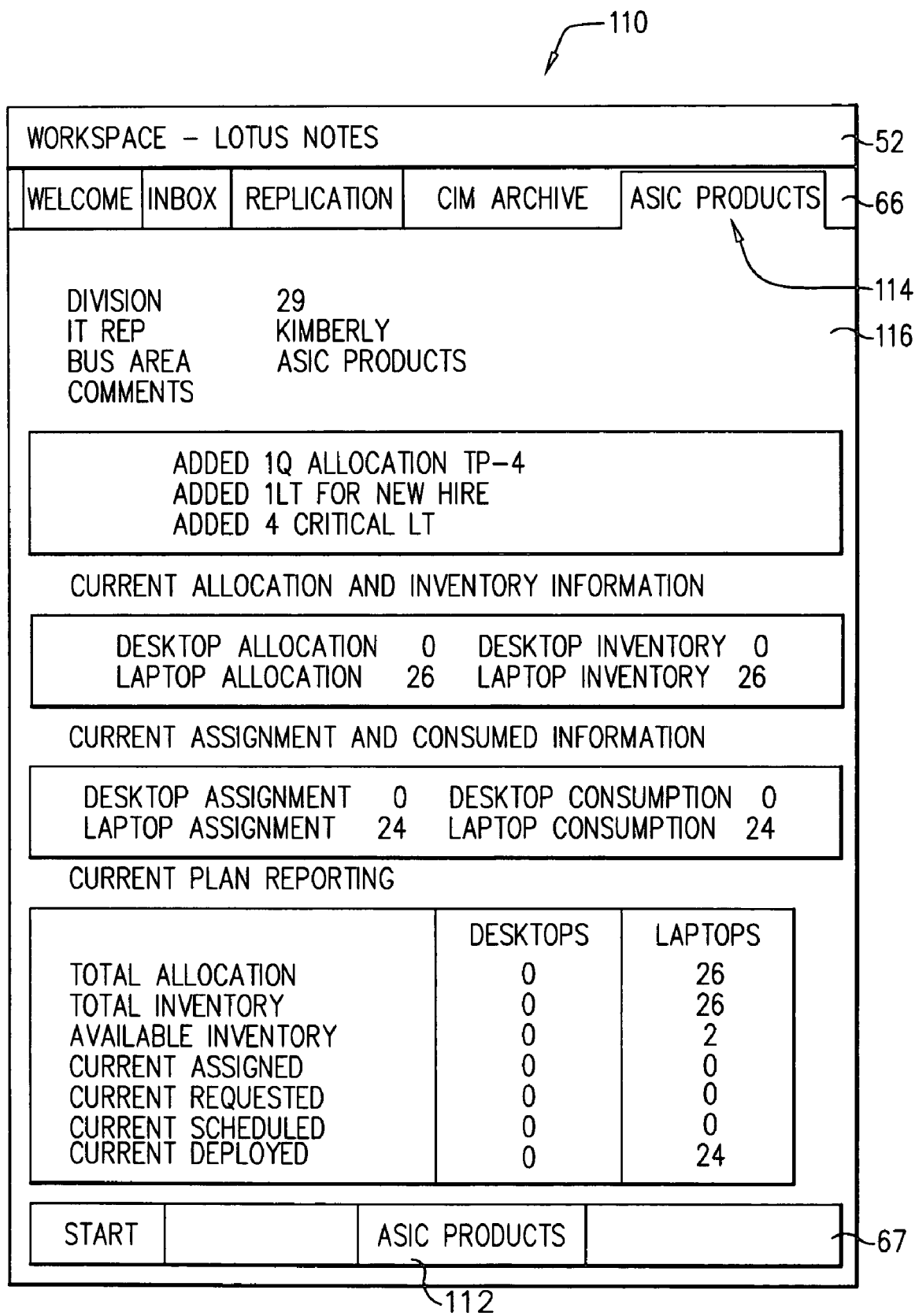

Referring to FIG. 7, a user interface 110 illustrates an individual record for an information technology (IT) representative. User selection of button 112 brings up under tab 114 a report 116 for an individual IT representative, in this case, for Kimberly (from Table 3), prepared from source database 43 by planning and deployment manager 44.

Figure 8:
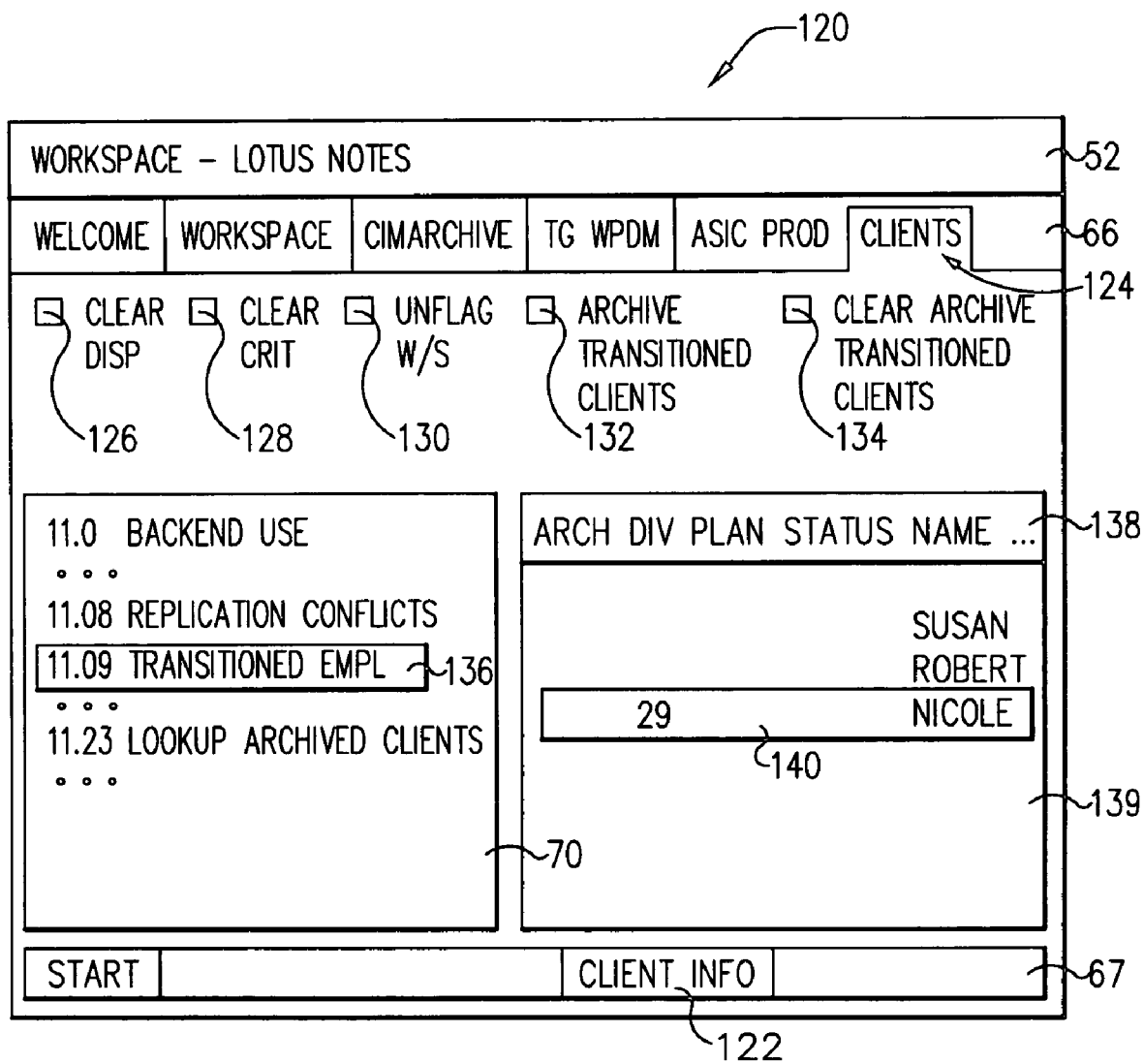

Referring to FIG. 8, a user interface 120 illustrates a report 139 of transitioned employees generated by selection of client information button 122 under clients tab 66 and selection of transitioned employees 136 from TOC 70. Field definitions 138 define the fields in the listing 139. Action buttons clear disposition 126, clear critical 128, unflag workstation 130, archive transitioned clients 132, and clear archive transitioned clients 134 perform the specified action with respect to employee 140 selected by the user from list 139. For example, selection of button 132 moves the highlighted employee record 140 from source database 43 to archive database 47.

Figure 9:
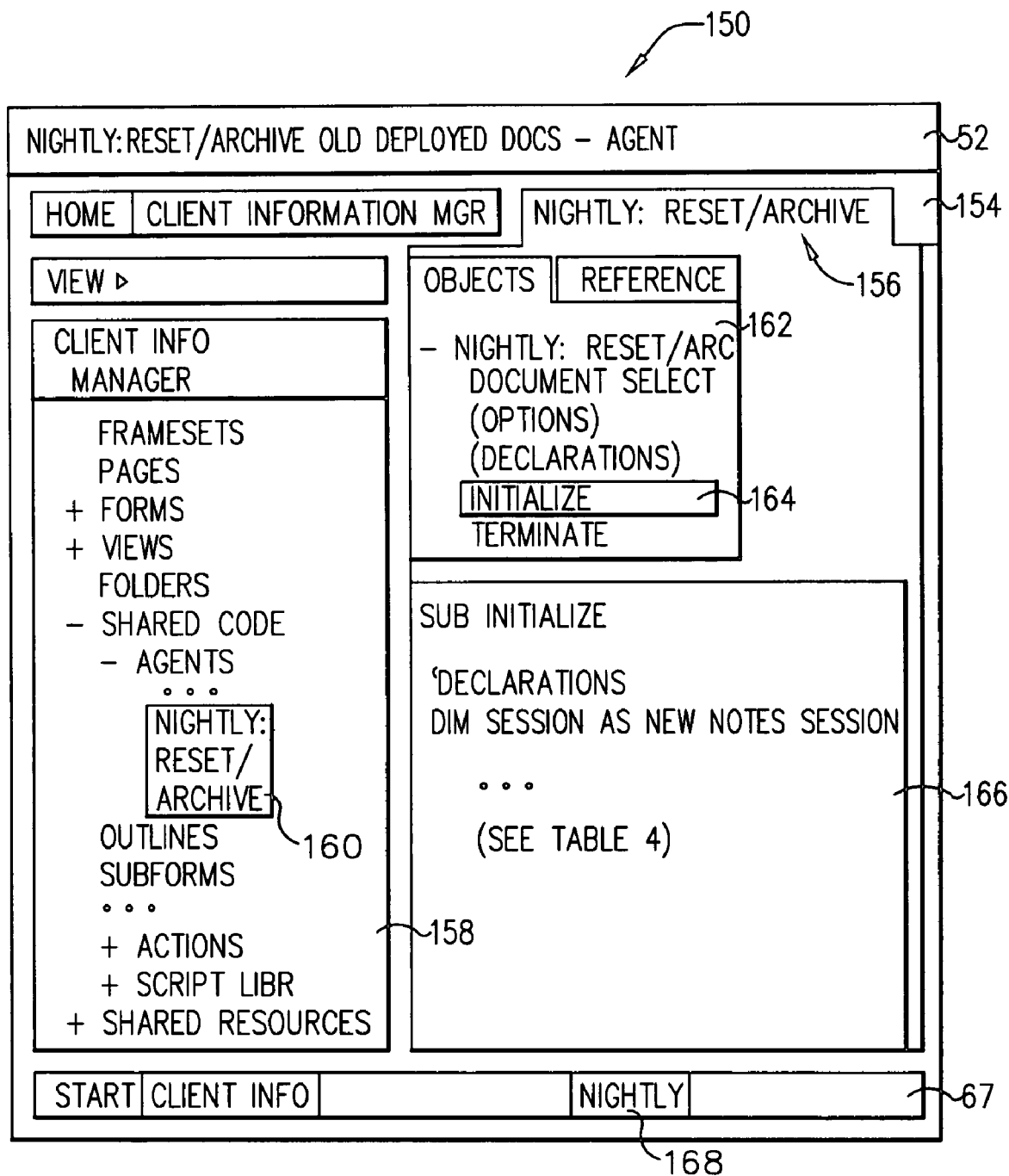

Referring to FIG. 9, user interface 150 illustrates agent 152, which is displayed under tab 156 responsive to selection of button 168 and of item 160 from TOC 158. The initialize 164 agent object upon being selected from objects 162, displays agent code listing 166, which is further shown in Table 4.

TABLE 4

EXAMPLE AGENT: REST/ARCHIVE OLD DEPLOYED DOCS

```
Function ResetAssetInfo (col As NotesDocumentCollection)
'This allows the Reset button to be activated via a
'schedule, manually, or on demand during a scheduled
'agent.
'Parameters:
'   NotesDocumentCollection,
'   Return Value:String,
'     any message returned if one exists
'Declarations
Dim session As New NotesSession
Dim CIM_db as NotesDatabase
Dim CIM_archive_db as NotesDatabase
Dim CIM_view2 as NotesView
Dim CIM_doc As NotesDocument
Dim CIM_doc2 as NotesDocument
Dim CIM_archive_doc As NotesDocument
Dim ProcessedCount As Integer
Dim NewHireCount As Integer
Dim NotProcessed As Integer
Dim process As Variant
Dim username As New NotesName (session.UserName)
'Make Initializations
ResetAssetInfo = **
Set CIM_db = session.CurrentDatabase
Set CIM_view2 = CIM_db.GetView("Config")
If CIM_view2 is Nothing Then
    ResetAssetInfo =
       "CIM configuration view could not be opened.
          Please contact a system administrator."
    Exit Function
Else
    Call CIM_view2.Refresh
    Set CIM_doc2 = CIM_view2.GetDocumentByKey("Config")
    If CIM_doc2 is Nothing Then
       ResetAssetInfo =
          "CIM configuration document could not be
             opened. Please contact a system
             administrator."
       Exit Function
    End If
End If
Set CIM_archive_db = New NotesDatabase (" "," ")
Archive_server = CIM_doc2.CIMArchiveDatabaseServer(0)
Archive_pathFN = CIM_doc2.CIMArchiveDatabasePathFN2(0)
Call CIM_archive_db.Open(Archive_server,Archive_pathFN)
If Note(CIM_archive_db.IsOpen) Then
    ResetAssetInfo =
       "CIM Archive Database could not be opened.
          Please contact a system administrator."
    Exit Function
End If
ProcessedCount = 1
NewHireCount = 0
NotProcessed = 0
While Not(ProcessedCount > col.Count)
    'Get doc
    Set CIM_doc = col.GetNthDocument(ProcessedCount)
    process = True
    'Check SRM status
    If CIM_doc.Form(0) = "ClientConfig" Or
       CIM_doc.Form(0) = "NonOffice" Or
       CIM_doc.Form(0) = "PartDeploy" Then
          CurrentName = CIM_doc.Name(0)
    Else
       CurrentName = CIM_doc.NewHireName(0)
    End If
    SRMNumber = CIM_doc.SRMNumber(0)
    ManagebySRM = CIM_doc.MangebySRM(0)
    RequestToSRM = CIM_doc.RequestToSRM(0)
    SRMCompleteDate = CIM_doc.SRMCompleted(0)
    If(ManagebySRM = "Yes" And
       SRMNumber< > " " And
```

TABLE 4-continued

EXAMPLE AGENT: REST/ARCHIVE OLD DEPLOYED DOCS

```
       SRMCompleteDate = " ") Or
       (ManagebySRM = "Yes" And
       RequestToSRM = "yes" And
       SRMCompleteDate = " ") Then
          Messagebox "Error Resetting for:"
             &CurrentName& ". The deployment for this
             client is being managed by IGS Deployment.
             The client must first have the deployment
             canceled or completed in the Service
             Requirements Database (SRM) before a reset
             will be possible.", 48, "Error"
          process = False
End If
CIMAssetStatus = CIM_doc.AssetStatus(0)
If (CIMAssetStatus = "Assigned" Or
    CIMAssetStatus = "Requested" Or
    CIMAssetStatus = "Scheduled") And
    process < > False Then
       Messagebox "Error resetting for:" & CurrentName
       & ". The client cannot be reset while it
       remains
          in the status " & CIMAssetStatus & ".", 48,
       "Error"
       process = False
End If
'Begin Processing of document
If process Then
'Create new Deployed Document in Archive
Set CIM_archive_doc =
    CIM_doc.CopyToDatabase(CIM_archive_db)
CIM_archive_doc.Form = "DeployedClient"
Call CIM_archive_doc.Save(True, True)
'Log the Reset
Call CIM_Log(CIM_doc, "Reset", " ")
'Begin resetting the client
If CIM_doc.Form(0) = "ClientConfig" Then
    CIM_doc.AAUpdateBy = session.EffectiveUserName
    CIM_doc.AAUpdateOn = Today( )
    CIM_doc.AssetStatus = " "
    CIM_doc.AssetType = " "
    CIM_doc.Disposition = " "
    CIM_doc.Plan = " "
    CIM_doc.Quarter = " "
    CIM_doc.CriticalDeploy = " "
    CIM_doc.Priority = " "
    CIM_doc.ITRepresentativeA =
       CIM_doc.ITRepresentative(0)
    CIM_doc.BusinessAreaA = CIM_doc.BusinessArea(0)
    CIM_doc.SubBusinessAreaA = CIM_doc.SubBusinessArea(0)
    CIM_doc.RefMachineSerialNumber =
       CIM_doc.MachineSerialNumber(0)
    CIM_doc.RefMachineType = CIMK_doc.MachineType(0)
    CIM_doc.RefMachineModel = CIM_doc.MachineModel(0)
    CIM_doc.RefProcessorSpeed =
       CIM_doc.MachineProcessorSpeed(0)
    CIM_doc.UnixToPC = " "
    CIM_doc.FlaggedForAssignment = " "
    CIM_doc.FlaggedAssettype = " "
    CIM_doc.CascadeClient = " "
    CIM_doc.CascadeMachineOwner = " "
    CIM_doc.CascadeMachineOwnerName = " "
    CIM_doc.CascadeMachineSerialNumber = " "
    CIM_doc.CascadeMachineType = " "
    CIM_doc.CascadeMachineModel = " "
    CIM_doc.MachineReserveType = " "
    CIM_doc.MachineReserveID = " "
    CIM_doc.MachineReserveName = " "
    CIM_doc.FlaggedBy = " "
    CIM_doc.FlaggedOn = " "
    CIM_doc.AssetAssignedBy = " "
    CIM_doc.AssetAssignedOn = " "
    CIM_doc.RequestedBy = " "
    CIM_doc.RequestedOn = " "
    CIM_doc.ScheduledPerSRM = " "
    CIM_doc.MarkedAsScheduled = " "
    CIM_doc.MarkedAsScheduledBy = " "
    CIM_doc.MarkedAsScheduledOn = " "
```

TABLE 4-continued

EXAMPLE AGENT: REST/ARCHIVE OLD DEPLOYED DOCS

```
    CIM__doc.DeployedPerSRM = " "
    CIM__doc.MarkedAsDeployed = " "
    CIM__doc.MarkedAsDeployedBy = " "
    CIM__doc.MarkedAsDeployedOn = " "
    CIM__doc.HoldDeployment = " "
    CIM__doc.OrderFromWDC = " "
    CIM__doc.SRMKitted = " "
    CIM__doc.SRMCompleted = " "
    CIM__doc.SRMRecovered = " "
    CIM__doc.SRMRecoveryStatus = " "
    CIM__doc.SRMDeploymentCanceled = " "
    CIM__doc.PlanFormat = " "
    CIM__doc.ServiceOption = " "
    CIM__doc.SRMNumber = " "
    CIM__doc.SRMService = " "
    CIM__doc.SRMServiceType = " "
    CIM__doc.RequestToSRM = " "
    CIM__doc.SupportingSRM = " "
    CIM__doc.SRMCampus = " "
    CIM__doc.SRMDeployedModel = " "
    CIM__doc.SRMDeployedMachSN = " "
    CIM__doc.SRMDeployedCPUSpeed = " "
    CIM__doc.SRMDeployedMemory = " "
    CIM__doc.CascadeMismatch = " "
    CIM__doc.MappedAssetType = " "
End If
'Now work with New Hires and Transfers
If CIM__doc.Form(0) = "NewHire" Or
    CIM__doc.Form(0) = "Transfer" Or
    CIM__doc.Form(0) = NonOffice" Or
    CIM__doc.Form(0) = PartDeploy" Then
        NewHireCount = NewHireCount + 1
        CIM__doc.MarkedForDeletion = "Y"
End If
'Changes for all documents
CIM__doc.Comments = CIM__doc.Comments(0) & Chrs$(10) &_
"<=======" & "Document reset occured on" & Date( ) &
"by" & username.Abbreviated & "=======>" & Chr$(10)
Else
        NotProcessed = NotProcessed + 1
    End If
    Call CIM__doc.Save(True,True)
    'Increment Count
    ProcessedCount = ProcessedCount + 1
Wend
'Give the final process counts back to the user
If NewHireCount < > 0 Then
    Messagebox("You have selected" &Str(NewHireCount) &
    "NewHire/Transfer/NonOffice/Parts document(s). These
    documents cannot be reset to un-assigned status for re-
    process. They have been archived and marked for
    deletion from the database.")
End If
If (ProcessedCount-1)-NewHireCount-NotProcessed< >0 Then
    Messagebox(Str((ProcessedCount-1)-NewHireCount-
    NotProcessed) & "Deployed Client document(s) have been
    created in the CIM Archive, and have been reset to un-
    assigned in CIM.")
End If
End Function
```

Advantages Over the Prior Art

It is an advantage of the present invention that there is provided a system and method maintaining excess and sensitive information out of the way of end-users and yet within a production setting where it can be queried in live time along with the production data.

ALTERNATIVE EMBODIMENTS

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-readable medium providing program code for use by or in connection with a computer or any instruction execution system. For the purposes of this description, a computer-readable medium can be any apparatus that can store the program for use by or in connection with the instruction execution, system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for creating, managing, and accessing an information repository including a source database and an archive database, said method comprising:

defining said source database and said archive database to a same schema;

providing to a user terminal a common user interface for accessing said source database and said archive database;

a processor of a computer system selectively executing a timed archive agent, an end user archive agent, and a criteria based archive agent for archiving source data from said source database as archive data to said archive database, said criteria based archive agent selectively archiving data based on constraints comprising straight scheduled archive, archive on demand, information becoming sensitive, and soft document deletion;

said processor selectively executing a criteria based restore agent and an end user restore agent to restore archive data from said archive database as source data directly to said source database, said criteria based restore agent selectively restoring archived data to said source database in response to criteria provided during execution of a scheduled agent such that a Reset button pertaining to said selectively restoring archive data is activated during said execution of said scheduled agent; and said processor executing an integrated functions agent to assemble compiled data from source data and archive data and present said compiled data to said user interface, said method further comprising:

displaying a first view of information specific to the source database, said first view displaying a first tab;

responsive to user selection of said first tab in the first view, adding a first table of contents to the first view to generate a modified first view followed by displaying the modified first view that displays the first tab and the first table of contents, said first table of contents being a first list of item identifiers that identify items in the source database;

responsive to user selection of a first item identifier from the first list of item identifiers in the first view, displaying a first lookup view into source database data of the source database.

2. The method of claim 1, said method further comprising:

displaying a second view of information specific to the archive database, said second view displaying a second tab;

responsive to user selection of said second tab in the second view, adding a second table of contents to the second view to generate a modified second view followed by displaying the modified second view that displays the second tab and the second table of contents, said second table of contents being a second list of item identifiers that identify items in the archive database, said first and second views being different views, said first and second tabs being different tabs; and responsive to user selection of a second item identifier from the second list of item identifiers in the second view, displaying a second lookup view into archive database data of the archive database.

3. The method of claim 2, said method further comprising:

compiling database data from said first and second lookup views into a common view; and presenting said common view to said user interface.

4. The method of claim 1, said method further comprising:

maintaining said archive data in said archive database integrated with said source database in a production setting which is outside of a production application; and querying said archive data in live time from said production application.

5. The method of claim 4, said production application being a client information manager, said information repository further including a deployment database, said method further comprising:

defining said deployment database to said same schema;

maintaining in said deployment database for each entity of a plurality of entities an asset budget; and operating said production application responsive to said deployment database, said source database, and said archive database to schedule and deploy said assets among said entities.

6. A computer system comprising a processor and a computer readable memory unit coupled to the processor, said memory unit containing instructions configured to be executed by the processor to implement a method for creating, managing, and accessing an information repository including a source database and an archive database, said method comprising:

defining said source database and said archive database to a same schema;

providing to a user terminal a common user interface for accessing said source database and said archive database;

selectively executing a timed archive agent, an end user archive agent, and a criteria based archive agent for archiving source data from said source database as archive data to said archive database, said criteria based archive agent selectively archiving data based on constraints comprising straight scheduled archive, archive on demand, information becoming sensitive, and soft document deletion;

selectively executing a criteria based restore agent and an end user restore agent to restore archive data from said archive database as source data directly to said source database, said criteria based restore agent selectively restoring archived data to said source database in response to criteria provided during execution of a scheduled agent such that a Reset button pertaining to said selectively restoring archive data is activated during said execution of said scheduled agent; and executing an integrated functions agent to assemble compiled data from source data and archive data and present said compiled data to said user interface, said method further comprising:

displaying a first view of information specific to the source database, said first view displaying a first tab;

responsive to user selection of said first tab in the first view, adding a first table of contents to the first view to generate a modified first view followed by displaying the modified first view that displays the first tab and the first table of contents, said first table of contents being a first list of item identifiers that identify items in the source database;

responsive to user selection of a first item identifier from the first list of item identifiers in the first view, displaying a first lookup view into source database data of the source database.

7. The computer system of claim 6, said method further comprising:

displaying a second view of information specific to the archive database, said second view displaying a second tab;

responsive to user selection of said second tab in the second view, adding a second table of contents to the second view to generate a modified second view followed by displaying the modified second view that displays the second tab and the second table of contents, said second table of contents being a second list of item identifiers that identify items in the archive database, said first and second views being different views, said first and second tabs being different tabs; and responsive to user selection of a second item identifier from the second list of item identifiers in the second view, displaying a second lookup view into archive database data of the archive database.

8. The computer system of claim 7, said method further comprising:

compiling database data from said first and second lookup views into a common view; and presenting said common view to said user interface.

9. The computer system of claim 6, said method further comprising:
    maintaining said archive data in said archive database integrated with said source database in a production setting which is outside of a production application; and
    querying said archive data in live time from said production application.

10. The computer system of claim 9, said production application being a client information manager, said information repository further including a deployment database, said method further comprising:
    defining said deployment database to said same schema;
    maintaining in said deployment database for each entity of a plurality of entities an asset budget; and
    operating said production application responsive to said deployment database, said source database, and said archive database to schedule and deploy said assets among said entities.

11. A computer program product, comprising a computer readable storage medium having program code stored therein, said program code containing instructions configured to be executed by a processor of a computer system to implement a method for defining said source database and said archive database to a same schema;
    providing to a user terminal a common user interface for accessing said source database and said archive database;
    selectively executing a timed archive agent, an end user archive agent, and a criteria based archive agent for archiving source data from said source database as archive data to said archive database, said criteria based archive agent selectively archiving data based on constraints comprising straight scheduled archive, archive on demand, information becoming sensitive, and soft document deletion;
    selectively executing a criteria based restore agent and an end user restore agent to restore archive data from said archive database as source data directly to said source database, said criteria based restore agent selectively restoring archived data to said source database in response to criteria provided during execution of a scheduled agent such that a Reset button pertaining to said selectively restoring archive data is activated during said execution of said scheduled agent; and
    executing an integrated functions agent to assemble compiled data from source data and archive data and present said compiled data to said user interface,
    said method further comprising:
        displaying a first view of information specific to the source database, said
    first view displaying a first tab;
        responsive to user selection of said first tab in the first view, adding a first table of contents to the first view to generate a modified first view followed by displaying the modified first view that displays the first tab and the first table of contents, said first table of contents being a first list of item identifiers that identify items in the source database;
        responsive to user selection of a first item identifier from the first list of item identifiers in the first view, displaying a first lookup view into source database data of the source database.

12. The computer program product of claim 11, said method further comprising:
    displaying a second view of information specific to the archive database, said second view displaying a second tab;
    responsive to user selection of said second tab in the second view, adding a second table of contents to the second view to generate a modified second view followed by displaying the modified second view that displays the second tab and the second table of contents, said second table of contents being a second list of item identifiers that identify items in the archive database, said first and second views being different views, said first and second tabs being different tabs; and
    responsive to user selection of a second item identifier from the second list of item identifiers in the second view, displaying a second lookup view into archive database data of the archive database.

13. The computer program product of claim 12, said method further comprising:
    compiling database data from said first and second lookup views into a common view; and
    presenting said common view to said user interface.

14. The computer program product of claim 12, said method further comprising:
    maintaining said archive data in said archive database integrated with said source database in a production setting which is outside of a production application; and
    querying said archive data in live time from said production application.

15. The computer program product of claim 14, said production application being a client information manager, said information repository further including a deployment database, said method further comprising:
    defining said deployment database to said same schema;
    maintaining in said deployment database for each entity of a plurality of entities an asset budget; and
    operating said production application responsive to said deployment database, said source database, and said archive database to schedule and deploy said assets among said entities.

* * * * *